United States Patent
Shepherd et al.

(10) Patent No.: US 11,614,583 B2
(45) Date of Patent: Mar. 28, 2023

(54) WAVEGUIDE AND SENSOR BASED ON SAME

(71) Applicant: Cornell University, Ithaca, NY (US)

(72) Inventors: Robert Shepherd, Ithaca, NY (US); Hedan Bai, Ithaca, NY (US); Shuo Li, Ithaca, NY (US); Yaqi Tu, Ithaca, NY (US)

(73) Assignee: Cornell University, Ithaca, NY (US)

( * ) Notice: Subject to any disclaimer, the term of this patent is extended or adjusted under 35 U.S.C. 154(b) by 134 days.

(21) Appl. No.: 16/767,918

(22) PCT Filed: Nov. 29, 2018

(86) PCT No.: PCT/US2018/063173
§ 371 (c)(1),
(2) Date: May 28, 2020

(87) PCT Pub. No.: WO2019/108862
PCT Pub. Date: Jun. 6, 2019

(65) Prior Publication Data
US 2021/0003388 A1    Jan. 7, 2021

Related U.S. Application Data

(60) Provisional application No. 62/642,407, filed on Mar. 13, 2018, provisional application No. 62/592,073, filed on Nov. 29, 2017.

(51) Int. Cl.
| | |
|---|---|
| *G01B 11/16* | (2006.01) |
| *G02B 6/122* | (2006.01) |
| *G02B 6/125* | (2006.01) |
| *G02B 6/12* | (2006.01) |

(52) U.S. Cl.
CPC ............ *G02B 6/1221* (2013.01); *G01B 11/16* (2013.01); *G02B 6/125* (2013.01);
(Continued)

(58) Field of Classification Search
CPC .................................................... G01B 11/16
See application file for complete search history.

(56) References Cited

U.S. PATENT DOCUMENTS

| | | |
|---|---|---|
| 4,295,738 A | 10/1981 | Meltz et al. |
| 4,420,251 A | 12/1983 | James et al. |
| | (Continued) | |

FOREIGN PATENT DOCUMENTS

| | | |
|---|---|---|
| CN | 1143999 A | 2/1997 |
| DE | 3822512 A1 | 1/1990 |
| | (Continued) | |

OTHER PUBLICATIONS

Mac Murray, B.C., et al., A Variable Shape and Variable Stiffness Controller for Haptic Virtual Interactions, 2018 IEEE International Conference on Soft Robotics (RoboSoft), Jul. 9, 2018, pp. 1-6. https://research.nvidia.com/sites/default/files/pubs/2018-04_A-Variable-Shape/Mac%20Murray%20Final%2020180228.pdf.
(Continued)

*Primary Examiner* — Charlie Y Peng
(74) *Attorney, Agent, or Firm* — Barnes & Thornburg LLP

(57) ABSTRACT

A waveguide is provided. The waveguide having a first core, a second core spaced apart from and parallel with the first core, and a cladding surrounding the first core and the second core. An interstitial portion of the cladding is located between the first core and the second core. A first region of the first core adjacent to the cladding or of the cladding adjacent to the first core is color dyed.

19 Claims, 6 Drawing Sheets

(52) U.S. Cl.
CPC .............. *G02B 2006/12069* (2013.01); *G02B 2006/12097* (2013.01); *G02B 2006/12138* (2013.01)

(56) References Cited

U.S. PATENT DOCUMENTS

| | | | |
|---|---|---|---|
| 4,484,179 | A | 11/1984 | Kasday |
| 5,363,463 | A | 11/1994 | Kleinerman |
| 6,003,340 | A | 12/1999 | Borak et al. |
| 6,519,382 | B1 | 2/2003 | Jurbergs et al. |
| 8,013,845 | B2 | 9/2011 | Ostergaard et al. |
| 9,063,617 | B2 | 6/2015 | Eliasson et al. |
| 9,811,211 | B2 | 11/2017 | Shimizu et al. |
| 2009/0080848 | A1* | 3/2009 | Suzuki ................ G02B 6/1221 385/129 |
| 2009/0097808 | A1 | 4/2009 | Wolfe et al. |
| 2010/0074575 | A1 | 3/2010 | Hamada |
| 2011/0098576 | A1 | 4/2011 | Hollstien |
| 2013/0285977 | A1 | 10/2013 | Baharav et al. |
| 2014/0205300 | A1 | 7/2014 | Hemenway, Jr. et al. |
| 2014/0285727 | A1 | 9/2014 | Seo et al. |

FOREIGN PATENT DOCUMENTS

| | | | |
|---|---|---|---|
| EP | 1757917 A1 | 2/2007 | |
| EP | 2188701 B1 | 4/2018 | |
| JP | 2004199032 A * | 7/2004 | |
| JP | 2008-145931 A | 6/2008 | |
| JP | 4819242 B2 * | 11/2011 | ........... G02B 6/0003 |
| WO | 9525258 A1 | 9/1995 | |
| WO | 2017/147573 A1 | 8/2017 | |
| WO | 2018/132482 A1 | 7/2018 | |

OTHER PUBLICATIONS

Zhao, H., et al., Optoelectronically innervated soft prosthetic hand via stretchable optical waveguides, Science Robotics, Dec. 6, 2016, vol. 1, pp. 1-10.
Paulino, T., 3-Dimensional Soft Magnetic Tactile Sensors for the Human-Friendly Robot Vizzy, University of Lisbon Masters Thesis, Nov. 2003, 7 pages.
Yang, Y., et al., Innovative Design of Embedded Pressure and Position Sensors for Soft Actuators, IEEE Robotics and Automation Letters, Apr. 2018, vol. 3, No. 2, pp. 656-663.
Wu, H., et al., A new robot skin for force and position detection, Industrial Robot: An International Journal, 2014, vol. 41, No. 6, pp. 534-542.
Yun, S., et al., Polymer-Waveguide-Based Flexible Tactile Sensor Array for Dynamic Response, Advanced Materials, Jul. 9, 2014, vol. 26, No. 26, pp. 4474-4480.
Chinese Office Action for Application No. 201880087593.2, dated Jan. 18, 2023, 5 pages.

* cited by examiner

WAVEGUIDE AND SENSOR BASED ON SAME

CROSS-REFERENCE TO RELATED APPLICATIONS

This application claims priority to U.S. Provisional Application No. 62/592,073, filed on Nov. 29, 2017, and U.S. Provisional Application No. 62/642,407, filed on Mar. 13, 2018, the disclosures of which are incorporated herein by reference.

STATEMENT REGARDING FEDERALLY SPONSORED RESEARCH

This invention was made with government support under contract no. N00014-17-1-2837 awarded by the Department of Defense. The government has certain rights in the invention.

FIELD OF THE DISCLOSURE

The present disclosure relates to force sensors, and in particular, sensors for use in soft robotics.

BACKGROUND OF THE DISCLOSURE

Stretchable optical waveguides made of elastomeric materials have been proven as effective sensors for soft robotics applications and wearable technologies. The elastic modulus and strain of these waveguide materials are close to that of soft robots and human skin. Therefore, stretchable waveguide sensors provide conformable contact with the soft body being sensed at all times, which is not achievable by rigid sensors.

Stretchable optical waveguides are sensitive to deformations. The waveguide output intensity decreases when the waveguide is deformed in any possible way, such as pressed, bent, or stretched. Previous stretchable waveguide sensor is composed of a transparent core with higher refractive index, and a cladding with lower refractive index. An LED is brought in contact with the waveguide input, and a photodiode is placed in contact with the waveguide output to measure the output intensity. With these waveguides, from the output intensity, one can only tell if the waveguide is deformed, but cannot tell which type of deformation is being applied. Furthermore, there is also no way to tell the location of the deformation along the waveguide with previous designs. No distributive sensing can be achieved with such stretchable waveguides.

Other optical approaches have been demonstrated to provide distributive sensing in prior arts. Fiber Bragg Grating (FBG) operates on measuring the wavelength shift of the returned Bragg signal, which is a function of parameters being measured (e.g., strain, stress, temperature). The Bragg Gratings can be created along the length of the waveguide and achieve location sensibility. However, this method has, for example, the following downsides: (1) Optical fibers used in these applications are flexible but not stretchable, so they cannot conform well to soft and stretchy bodies. (2) The instrument to measure wavelength shift is quite large, and does not allow for compact and wireless sensing for small soft robot and wearable gadgets.

Another scheme achieves distributive tactile sensing through frustrated total internal reflection. In this scheme, a clear acrylic plate is connected to a light source to perform as a waveguide, where light propagates through total internal reflection (TIR) within the plate (refractive index $n_{plate} > n_{air}$). A compliant membrane is layered over the acrylic plate loosely, allowing air gap in between the membrane and the plate ($n_{membrane} > n_{air}$). When external force is applied to the membrane, air gap collapses, bringing membrane in close contact with the plate. The high index membrane frustrates the TIR in the acrylic plate and causes diffuse reflection, which is collected by the CCD camera placed beneath the acrylic plate. Although this method is good at tactile sensing, it cannot sense any other deformations, such as bending and stretching, other than pressing. Furthermore, this setup involves rigid pieces and defeats the goal of having entire sensor compliance to match the soft bodies.

Another type of such sensor operates on the principle of light scattering in polymer foam upon deformation. The sensor system is composed of numerous repeating units of a certain type of sensing element. Each sensing element is constructed with one LED, one photodiode, and one piece of polymer foam. The LED and photodiode are placed side by side facing up, covered by the polymer foam. The light from the LED is scattered by the air bubbles in the polymer foam, and the scattered light intensity is measured by the photodiode. As the polymer foam is deformed, the scattered light intensity changes. Although this system offers better mechanical flexibility by decomposing rigid parts into small modules, it still does not offer true stretchability and conformability. It is also only sensitive to pressure, and not other types of deformations. Furthermore, the spatial resolution of the sensor system depends on the density of the LED and photodiode modules, which is very power consuming.

Based on the foregoing, there exists an unmet need for a sensor that addresses one or more of the aforementioned deficiencies.

BRIEF SUMMARY OF THE DISCLOSURE

The present disclosure describes, in various examples, multicore, color-doped (color-dyed), stretchable waveguides, which can be designed as a compact and low cost optical waveguide sensor. The sensor can differentiate pressing, stretching, and bending deformations, and measure the location and magnitude of the deformation. In some embodiments, the sensor is made from elastomeric materials (e.g., soft elastomeric materials). As such, the sensor may be advantageous for use with various robotic actuators (e.g., soft robotic actuators). Through an innovative design and integrated electronics, a sensor can provide simultaneous distributive sensing and decouple multiple modes of deformation, with spatial sensitivity, e.g., down to sub-mm and a wide range.

Embodiments of the waveguides and sensors of the present disclosure offer various capabilities, including, for example, a tactile sensor that can detect and differentiate local pressure, curvature, and elongation, with simple setup, readily wireless connections, or a combination thereof. The data measured/obtained using the sensors offer desirable information in applications such as, for example, real time sensation in remote surgery, virtual reality (VR) glove, soft prosthetics and orthotics, and smart robotic hand and arms, and the like.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
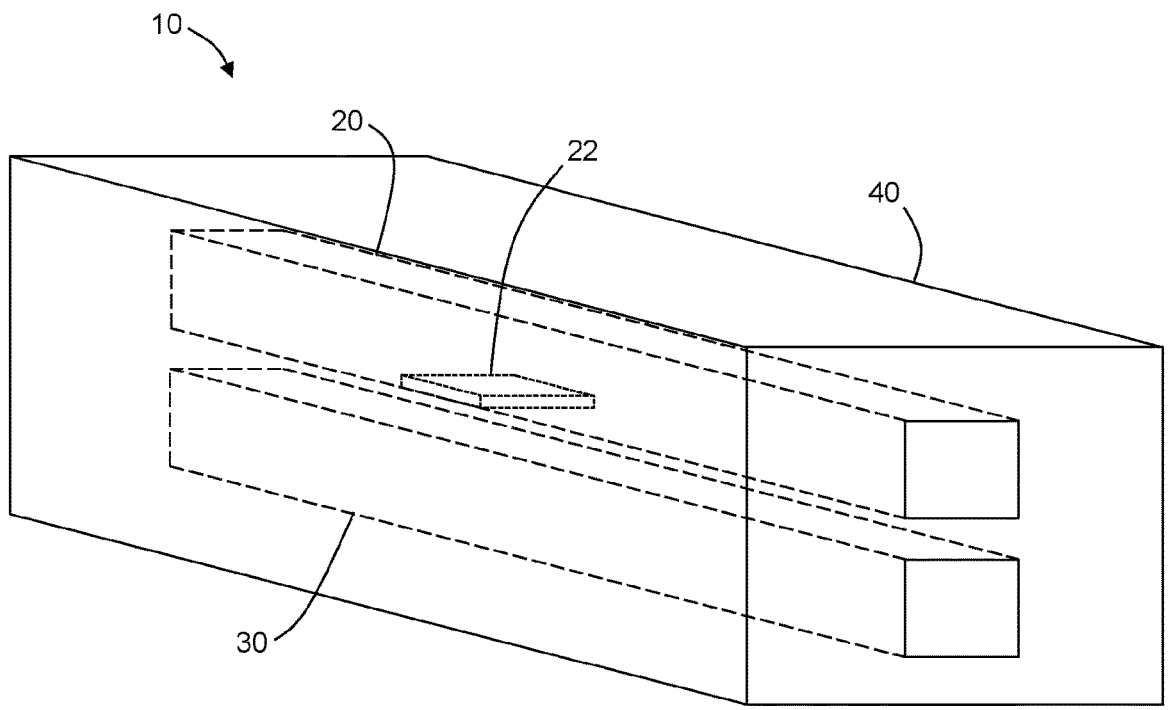
FIG. 1. A perspective view diagram of a waveguide according to an embodiment of the present disclosure.

With reference to FIG. 1, in a first aspect, the present disclosure may be embodied as a waveguide 10 for use in a sensor. The waveguide 10 includes a first core 20 having a first refractive index. A second core 30 is spaced apart from the first core 20 and parallel with the first core 20. The second core 30 has a second refractive index which may be the same as or different from the first refractive index. The cores are transparent. In a non-limiting example, a suitable core transmits 80% or more of incident visible light having a wavelength of 400 to 750 nm. Other suitable cores will be apparent in light of the present disclosure.

The cores can have various cross-sectional area. For example, a first core may be, but does not have to be larger than the second. In an example, a first core is 3 mm wide and 1.5 mm thick and a second core is 2 mm wide and 1 mm thick.

A cladding 40 surrounds the first core 20 and the second core 30. The cladding 40 has a refractive index which is lower than the first refractive index and the second refractive index. An interstitial portion 42 of the cladding 40 is located between the first core 20 and the second core 30.

In some embodiments, the first core 20 of the waveguide 10 includes a first region 22 which is dyed (i.e., doped with a color dye)—sometimes referred to herein as the first color-dyed region 22. The first color-dyed region 22 is adjacent to the cladding 40 and along a portion of the length of the first core 20. In some embodiments, the first color-dyed region 22 is adjacent to the interstitial portion 42 of the cladding 40. In some embodiments, the first color-dyed region 22 extends over a cross-sectional area of the first core 20 which is less than or equal to 50% of a cross-sectional area of the first core 20. In some embodiments, a first region of the interstitial portion adjacent to the first core is dyed.

Generally, the presently-disclosed waveguide operates such that various deformations of the waveguide at the dyed region cause distinctive combinations of local light behavior, selectively including change of light color caused by the dye(s), loss of light intensity through a change in the geometry of the cores, and coupling between the cores. In particular, the waveguide may be used to differentiate pressing, stretching, and bending deformations, and/or to measure the location and magnitude of the deformation.

When no deformation is applied, light from a broadband light source (for example, a white LED) is guided inside the first core through total internal reflection (TIR) with minimal loss, because the refractive index (n) difference in the waveguide core and cladding material (e.g., $n_{core}$~1.49, $n_{cladding}$~1.4). As the result, bright white light can be detected at the other end of first core, and faint white light can be detected at the end of second core, because a few white light rays are coupled into the second core due to the thin translucent silicone barrier layer. Methods to differentiate various deformations are summarized in Table 1 and explained in the following.

Pressing

When the waveguide is pressed, the interstitial cladding in between the first and second cores is compressed, getting thinner and curved at the location of the pressing force. This frustrates the total internal reflection (TIR) in the first core, causing diffuse reflection locally. Part of the rays being diffuse reflected couple into the second core, and propagate to the end of the second core through TIR. When a colored region is pressed, white light rays in the first core will diffuse through the absorbing dyes and couple into the second core. At the output end of the waveguide, the first core gives an output of attenuated white light, and the second core gives an output of colored light, with the color corresponding to the dyed region being pressed, and color saturation indicating the intensity of the force applied. By color coding the spatial information through patterning the absorbing dyes (FIGS. 3 and 4A), distributive sensing for pressing forces can be achieved.

Stretching

The waveguide can also be used to measure local elongation. When the color-dyed region is stretched, the light output of the first core will change from white light into colored light, with the color corresponding to the stretched region, and the color saturation representing the amount of elongation. This effect agrees with Beer-Lambert Law (A=ecL), which states the attenuation of light (A) traveling through a medium is proportional to absorptivity of attenuating species (e), molar concentration of attenuating species (c), and path length (L). In the dyed region(s), color absorbing dye is the major attenuating species. As the dyed region is stretched, the length of the dyed region (L) increases, the cross-sectional area decreases, and the volume of the region is unchanged compared to undeformed state. This is because Poisson's ratio of, for example, polyurethanes is close to 0.5, which means a polyurethane core (in a non-limiting example) is incompressible. The molar concentration of the dye (c) is unchanged in the volume being stretched. Absorptivity (e) is a material property and is also not changed by the deformation. Therefore, the color change at the first core output is solely due to the increase in length of the dyed region. The second core output is white light with attenuated intensity, since it is also being stretched.

Bending

When the waveguide is locally bent away from the dyed surface, the first core output changes color drastically from white to the color of the bent region. This is because at the location of the bend, ray power in the first core is concentrated at the outer edge of the bend, where the color dyes are deposited. In an undeformed straight waveguide, ray power is concentrated at the middle of the first core, where it is transparent with no color dyes. The second core output is white light with no significant attenuation, since it is placed close to neutral bending plane.

The differentiation and measurement of various types of deformations can be obtained from reading and analyzing both the intensity information and the color information from the two RGB sensors. (Table 1)

TABLE 1

Intensity and RGB change in two RGB sensors upon different deformations in the waveguide

| Local Deformations | Second Core Intensity Change | Second Core RGB Change | First Core Intensity Change | First Core RGB Change |
|---|---|---|---|---|
| Pressing | High | High | Moderate | None |
| Bending | Low | None | High | High |
| Stretching | High | None | High | Moderate |

Various dyes can be used. The dyes can be for example, visible light absorbing dyes, infrared absorbing dyes, and the like. The dyes may be organic dyes, which may comprise absorbing or scattering particles. An infrared absorbing dye may comprise particles that scatter infrared light. In an example, a dye is a non-scattering dye, which may have desirable transmittance (e.g., 90% or greater, 95% or greater, or 99% or greater) of non-absorbed wavelengths (e.g., non-absorbed visible light).

For example, the dyes may be absorbing dyes with absorption wavelength in the visible spectrum (e.g., 400-800 nm) and/or infrared spectrum. Various combinations of dyes can be used. The dyes have desirable transparency. In certain cases, it is desirable for light to pass through the dyed material without being scattered. As an example, light first passes through a dyed region (e.g., a blue dyed region). Examples of dyes are described herein. In various examples, the dyes are water clear visible color absorbing dyes or a combination of such dyes. In the case of white light input (e.g., a broad spectrum white LED), dye(s) are used to absorb various wavelength of the broad spectrum white light input. In an example, a dye absorbs one or more wavelengths in the visible spectrum (e.g., 550 to 680 nm for a blue dye).

Within a dyed region, corresponding wavelengths (e.g., with blue dye, 550 to 680 nm) are absorbed by the dye. And the unabsorbed wavelengths continue to transmit to the end of the waveguide. This would work not with an opaque dye, where all light is absorbed, scattered, reflected, or a combination thereof, and no light transmits through it.

The following table has the absorption/transmission information for examples of dyes. By "Absorbed Wavelengths," it is meant that the wavelengths the dye absorbs (e.g., a blue dye will typically absorb wavelengths of 550-700 nm (Absorbed Wavelengths), and transmit wavelengths of 400-550 nm (Unabsorbed Wavelengths).

|  | Absorbed Wavelengths | Unabsorbed Wavelengths |
|---|---|---|
| Absorbance | 0.5~2 dB/mm | 0.05~0.25 dB/mm |
| Transmittance | 60%~90%/mm | 95%~99%/mm |

As described above, the color dye can be placed in the first core, or can be placed in the cladding in between two cores. For the latter arrangement, the location and magnitude of bending and pressing deformations can be sensed, but location information of stretching deformation will be lost.

Dye Pattern

In some embodiments, the first core may have one or more additional color-dyed regions. In some embodiments, the first color-dyed region and the one or more additional color-dyed regions do not overlap one another along a longitudinal length of the first core. In this way, the dye regions may be considered discrete (see, e.g., FIG. 3, top and further described below). In some embodiments, the first color-dyed region overlaps with an additional color-dyed region along the length of the first core. For example, the first color-dyed region and the overlapping additional color-dyed region may be tapered to form a color gradient along the length of the first core (see, e.g., FIG. 3, middle and further described below).

Figure 3:
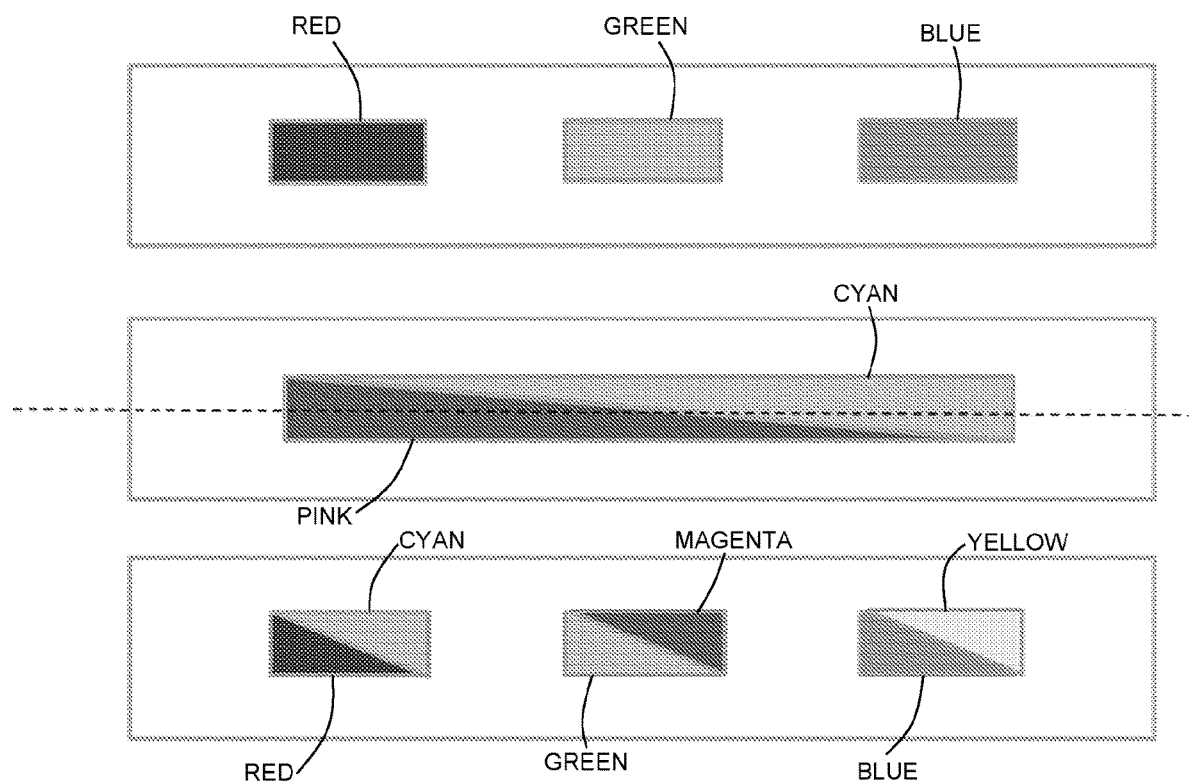
FIG. 3. Top view (yz plane) diagrams of exemplary dye patterns that can be used in embodiments of the disclosed waveguide. Top: discrete dye; Middle: gradient dye; Bottom: combination of discrete and gradient dye.
Figure 4A:
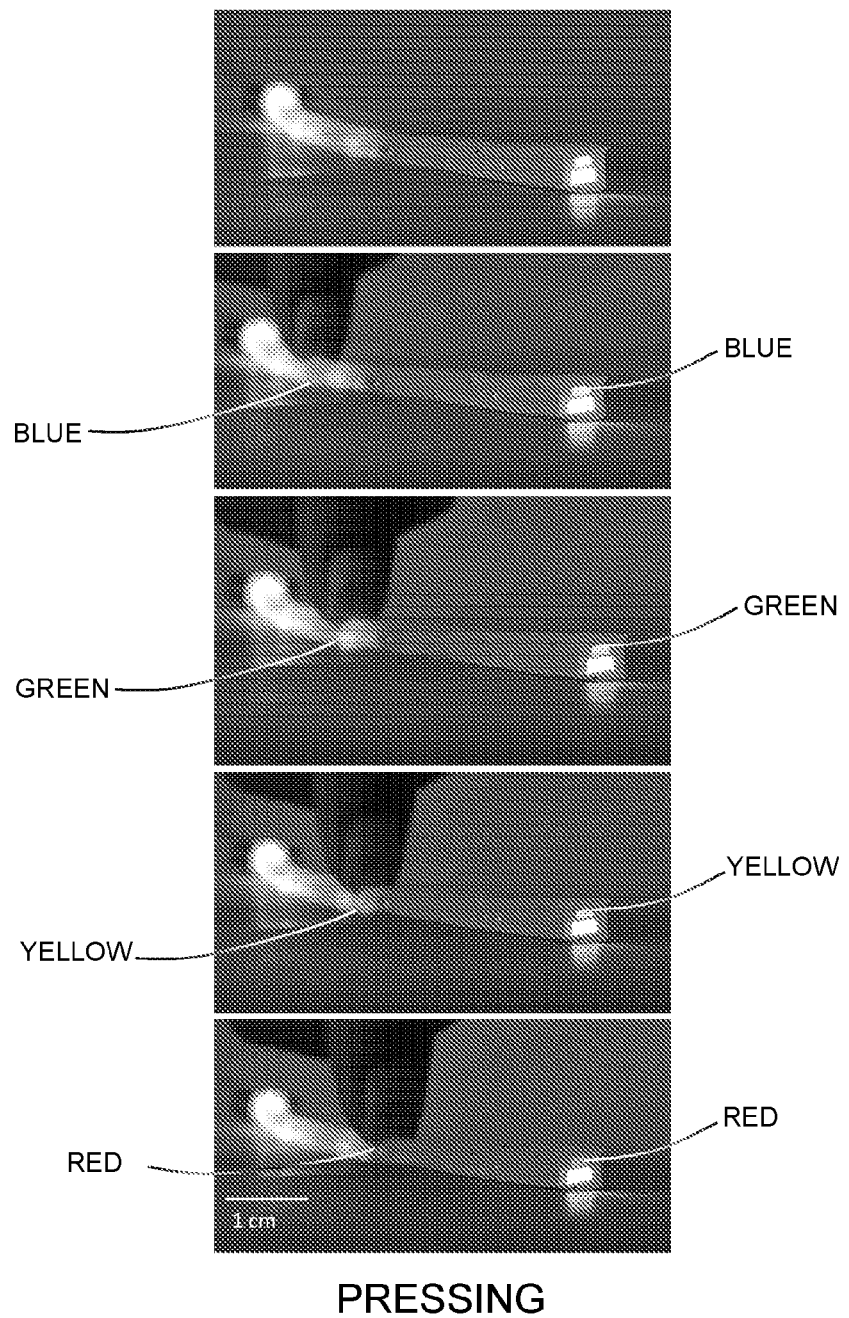
FIG. 4A. A series of photographs showing output results during pressing deformation of a waveguide according to the present disclosure.
Figure 4B:
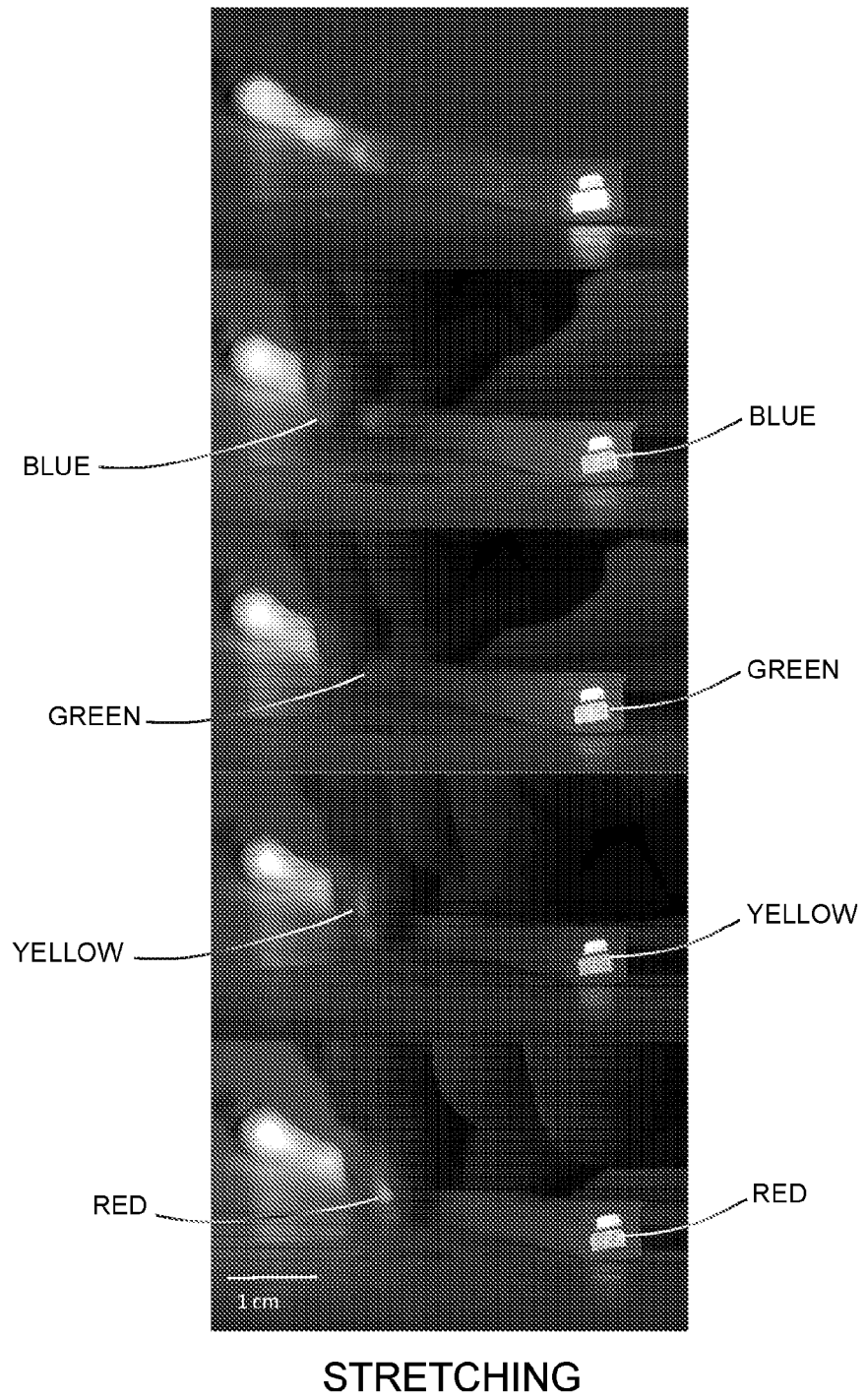
FIG. 4B. A series of photographs showing output results during stretching deformation of a waveguide according to the present disclosure.
Figure 4C:
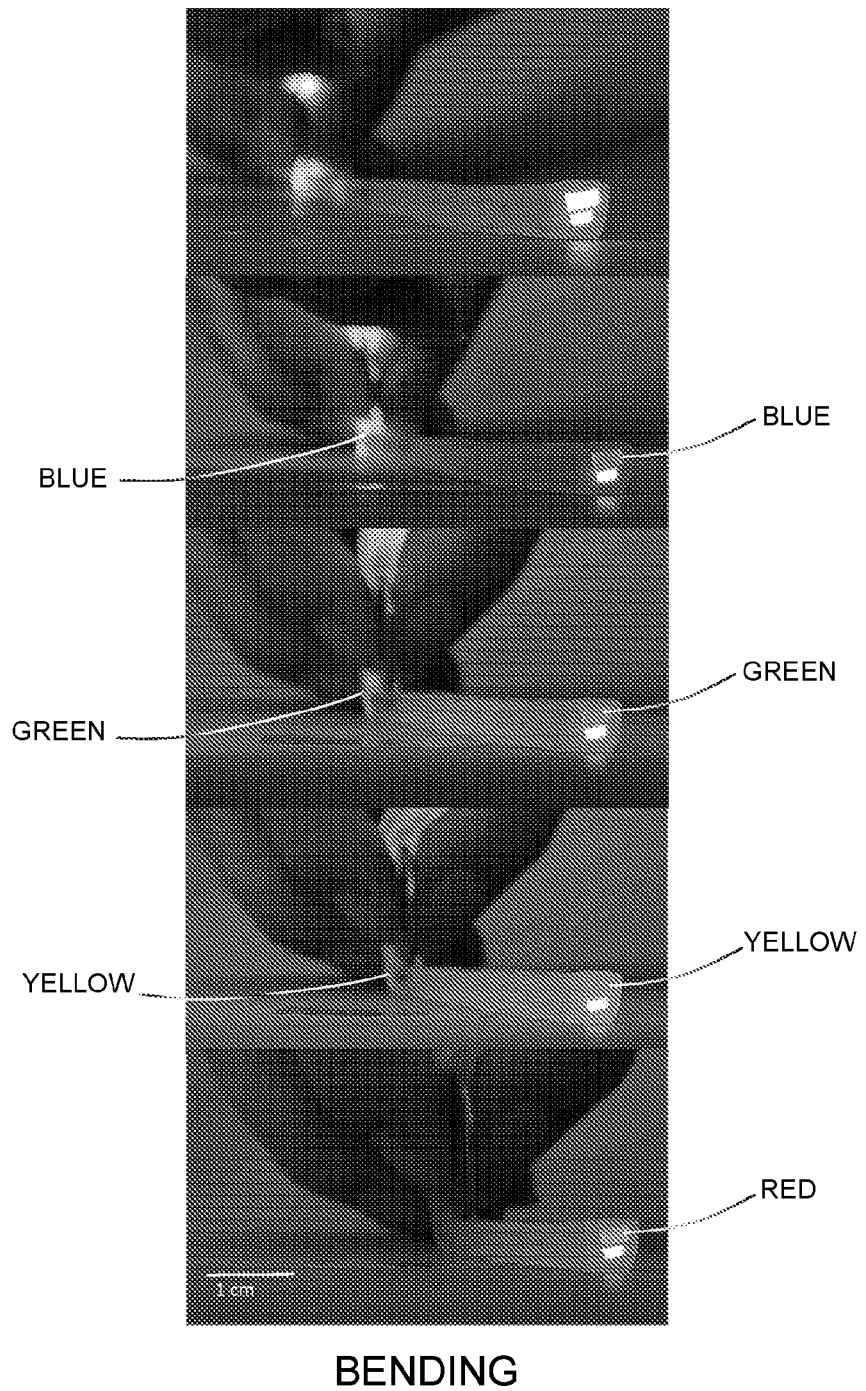
FIG. 4C. A series of photographs showing output results during bending deformation of a waveguide according to the present disclosure.

By using a core or cores with different color pattern designs, various sensing capabilities can be achieved. The pattern designs include but are not limited to discrete dye doping, gradient dye doping, and a combination of the two. Exemplary dye patterns are shown in FIG. 3 and described below.

A dye pattern can be a discrete dye pattern. In an example of a discrete dye design (e.g., FIG. 3, top design), a thin layer of dye is deposited in rectangular cavities on the top surface of the first core. The spatial resolution is dependent on the length of dyes and spacing between the dyes. Therefore, this design offers a discrete sensing for pressing, stretching and bending. Despite the limitation in spatial resolution, this design offers capability of multi-location deformation sensing. For example, in the case of multi-touch tactile sensing, this design can measure forces applied to each dyed region by interpolating the output color in the second core.

A dye pattern can be a gradient dye pattern. Gradient dye design (e.g., FIG. 3, middle design) addresses the spatial resolution limitation in the discrete dye design. By doping a thin layer of two color dyes in overlaid complementary triangular cavities, a color spectral gradient is created. In the example shown in the middle pattern of FIG. 3, the spectrum of the color changes continuously from pink (left) to green (right) along the length of the dyed region. Since the ray power of white light in the waveguide is symmetric about the xz plane (represented by the black dashed line in FIG. 3), the color change upon deformation along the waveguide length (z direction) corresponds to the color gradient defined by the dyes. Therefore, continuous spatial resolution for various deformation is achieved.

Leveraging the advantages of the two patterns above, a combined pattern (e.g., FIG. 3, bottom design), where each discrete region is subdivided into two colors to form a color gradient, can be used to detect multi-location deformation and have distributive sensing capability in each dyed region.

The cladding 40 can be fully or partly opaque. For example, the cladding may have more than 10 dB/cm absorbance. In some embodiments, the cladding can be configured to absorb light.

The first and second cores 20, 30 can have various size and/or shape. For example, the first core 20 and/or the second core 30 may have a cross-sectional shape that is circular, polygonal, or the like. As long as the two faces sandwiching the interstitial cladding layer (e.g., the color-dyed face of a first core and the adjacent face of the second core) are parallel faces, any shape/dimension variation can be used matter. For example, the first and second cores could be two hemispheres, etc. The first core 20 may have a cross-sectional area that is greater than a cross-sectional area of the second core 30. In other embodiments, the first and second cores may have equal cross-sectional areas. In other embodiments, the first core 20 may have a cross-sectional area that is less than a cross-sectional area of the second core 30. The cores can be as large or as small as needed for particular applications. For example, the first core 20 and/or the second core 30 may have a diameter of 10 μm to 5 cm, inclusive, including all integer μm values and ranges therebetween. In another example, the first core 20 and/or the second core 30 may have a cross sectional area of 100 μm$^2$ to 25 cm$^2$, inclusive, including all integer μm$^2$ values and ranges therebetween.

The core(s) and cladding can comprise various elastomeric materials. Non-limiting examples of suitable elastomeric materials include, various synthetic rubbers (e.g., silicone rubber, polyurethane, styrene-butadiene rubber, polybutadiene, neoprene, etc.), natural latex rubbers, biodegradable materials (e.g., poly sebacic acid), or combinations thereof. Various functional groups (e.g., alkene, carboxylate, benzene, acryloyl group, etc.) can be grafted onto the main chains of these materials to modify the optical properties (e.g., refractive index, light absorbance) of both the core and the cladding. Each core may comprise the same material(s) or different material(s). In some embodiments, the first core and the second core are made from a material with a higher hardness than the material of the cladding.

Figure 5:
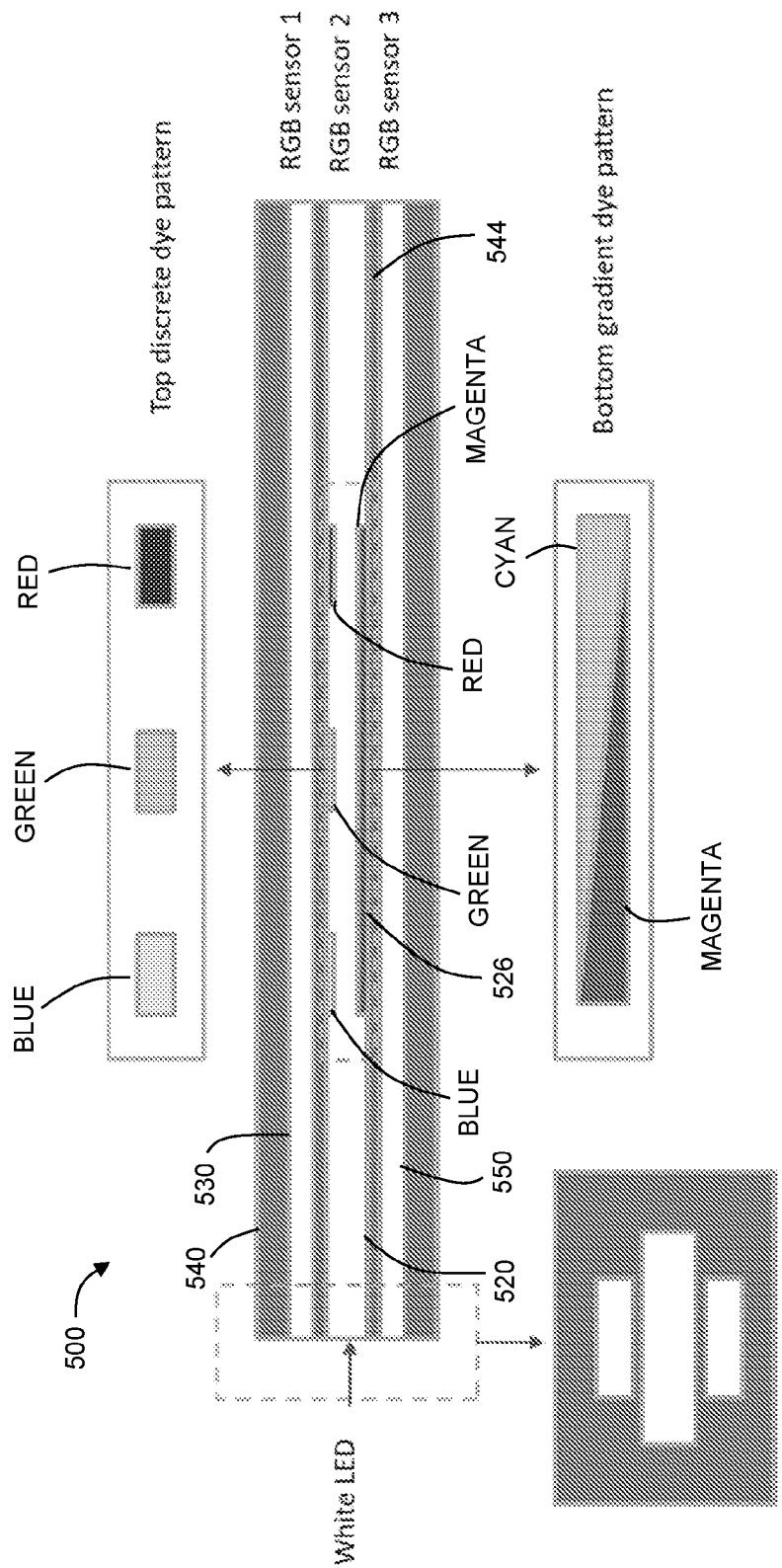
FIG. 5. A sensor having a waveguide according to another embodiment of the present disclosure.

In some embodiments, a waveguide 500 may have a cladding 540, a first core 520, a second core 530, and a third core 550. Each of the second core 530 and the third core 550 is adjacent to the first core 520. A second interstitial portion 544 of the cladding 540 is located between the third core 550 and the first core 520. A second region 526 of the first core 520 adjacent to the second interstitial cladding 544 is color-dyed. An example of a configuration is shown in FIG. 5. In this example, the waveguide includes a main core (first core) placed in the middle and two second cores each placed adjacent to the first core. One side of the first core is doped with discrete dye pattern, while the opposite side is doped with gradient dye pattern. By detecting the output of the three cores using, for example, RGB sensors, this configuration allows simultaneous multi-location sensing, enabled by discrete dye, and continuous sensing, enabled by gradient dye.

Figure 2:
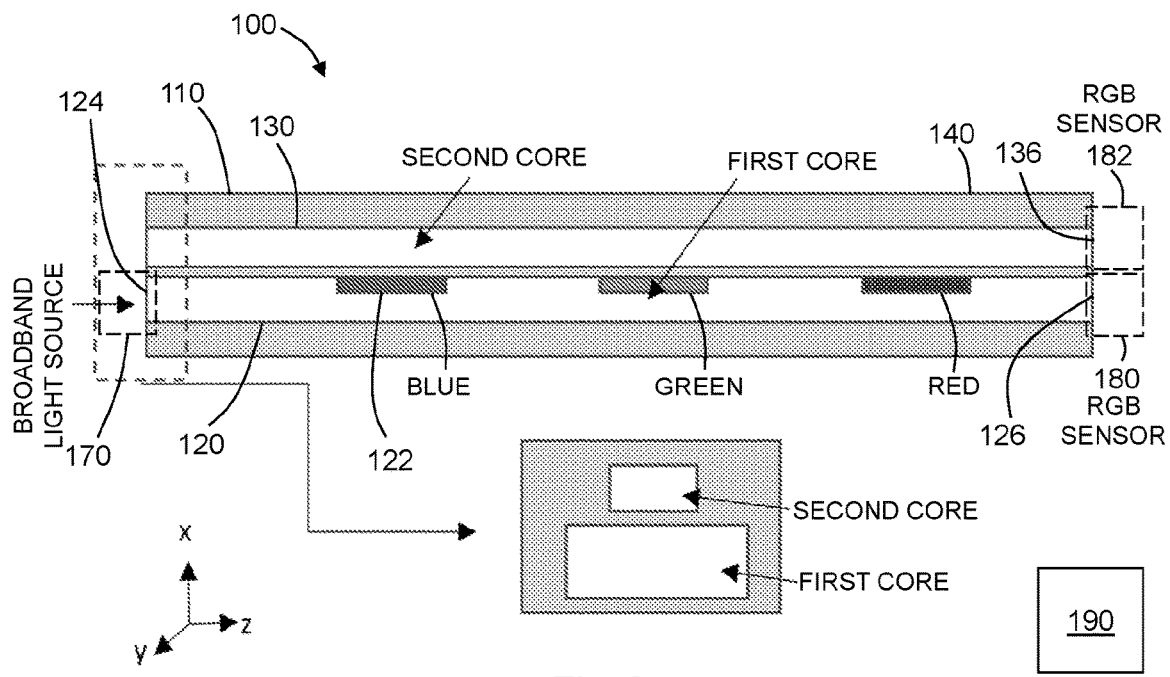
FIG. 2. Cross section views of a waveguide sensor according to another embodiment of the present disclosure. The gray area is cladding, the white areas are cores, and the areas labeled with colors are regions doped with color dyes. Top: A section view along the waveguide length (xz plane). Bottom: A section view across from the waveguide length (xy plane).

With reference to FIG. 2, in another aspect, the present disclosure may be embodied as a sensor 100. The sensor 100 includes a waveguide 110 according to any of the embodiments described herein. For example, the sensor 100 may include a waveguide 110 having a first core 120, a second core 130, and a cladding 140. A first color-dyed region 122 of the first core is adjacent to an interstitial portion of the cladding 140.

The sensor 100 further includes a broadband light source 170 coupled to an input end 124 of the first core 120. An exemplary light source may be a light-emitting diode (LED). A broad-spectrum light source, such as a white LED, will cooperate with the color-dyed regions of the waveguide to provide suitable output signals for the purposes described herein. It should be noted that examples are provided with "color" dyes and "color" detectors, and such embodiments are intended to include wavelengths which are not visible to humans, such as infrared light. Non-limiting examples of sources include visible light sources, infrared sources, and the like or combinations thereof.

A first detector 180 is coupled to an output end 126 of the first core 120. The output end 126 may be at the opposite end of the first core 120 from the input end 124. In other embodiments, the input end and output end may be at the same physical end of the first core, and a reflector or similar device may be used at the opposite end of the core. A second detector 182 is coupled to an output end 136 of the second core 130. Non-limiting examples of detectors include visible light sensors (including, for example, RGB sensors), infrared sensors, and the like or combinations thereof.

Embodiments of such a sensor can be referred to as optical waveguide-based distributive sensors, as optical transducer systems, or as waveguide sensors/systems. Made of elastomeric materials and incorporated with visible spectrum absorbing dyes, a sensor can measure and differentiate the magnitude and location of various modes of deformation: pressing, stretching, bending, or a combination thereof. The disclosed sensors feature, in various examples, a compact, low cost, easy to fabricate system comprising the waveguide described as above, plus a broad-spectrum light emitting diode (LED) that serves as a light source from one end of the sensor and a portable red-green-blue (RGB) color light sensor chip that receives the transduced optical signal from the other end.

It may be desirable that the cross-sectional sizes of the cores are commensurate with the detector size (e.g., the size of an RGB chip). In some examples, it may be desirable that the cross-sectional area of the core is not smaller than the active sensing area of the sensor (e.g., an RGB chip that may have an active sensing area of, for example, 400 square micrometers).

In another aspect, the present disclosure may be embodied as a method of detecting deformation of a waveguide. The method includes providing a sensor according to any of the embodiments disclosed herein. The method further includes detecting a light change at the output end of the first core and the second core. The deformation of the waveguide is differentiated and/or measured based on the detected light change. The light change may comprise, for example, a change in light intensity and/or a change in wavelength (i.e., RGB change). Such changes may be within the first core, the second core, or both cores.

The present disclosure describes, in various examples, multicore, color-doped (color-dyed), stretchable waveguides, which can be designed as a compact and low cost optical waveguide sensor. The sensor can differentiate pressing, stretching, and bending deformations, and measure the location and magnitude of the deformation. In some embodiments, the sensor is made from elastomeric materials (e.g., soft elastomeric materials). As such, the sensor may be advantageous for use with various robotic actuators (e.g., soft robotic actuators). Through an innovative design and integrated electronics, a sensor can provide simultaneous distributive sensing and decouple multiple modes of deformation, with spatial sensitivity, e.g., down to sub-mm and a wide range.

Embodiments of the waveguides and sensors of the present disclosure offer various capabilities, including, for example, a tactile sensor that can detect and differentiate local pressure, curvature, and elongation, with simple setup, readily wireless connections, or a combination thereof. The data measured/obtained using the sensors offer desirable information in applications such as, for example, real time sensation in remote surgery, virtual reality (VR) glove, soft prosthetics and orthotics, and smart robotic hand and arms, and the like.

In various examples, a sensor of the present disclosure may provide one or more of the following:
The sensor can differentiate and measure the magnitude and distributive location of various deformations respectively, including pressing, stretching, bending, and combinations thereof
The waveguide is made solely of soft, flexible, and highly stretchable elastomers that can be stretched up to 600% uniaxial strains. This makes the sensor adaptive and conformable to complex shaped surfaces or objects that can largely deform.

Distributive sensing along one or more waveguide is achieved through selective absorption of white light via visible absorptive dyes doped in sequence/patterns in the core of the waveguide.

The sensor is more compact, easier to implement, has lower cost, and consumes less power than the related technologies.

The mode, location, and magnitude of deformation can be directly measured and translated from the data of total light intensity, RGB values of color and saturation collected by RGB sensors. Compared to related technologies, the data does not require further, complicated data interpretation.

Range and sensitivity of the sensor can be tuned to different applications by modifying the thickness of different layers in the waveguide.

A sensor can detect or sense deformation (e.g., deformation mode, location, magnitude of deformation, or a combination thereof). A sensor can detect various deformation modes (e.g., pressing, stretching, bending, or a combination thereof).

A waveguide sensor comprises at least one core having one or more region (e.g., adjacent to the interstitial cladding) that is dyed (e.g., color dyed). For example, with one or more dye which may be in discrete or gradient patterns. The dye encodes the spatial information with, for example, color(s). The color-dyed region(s) are configured in the waveguide such that upon deformation(s), the waveguide outputs change color, providing spatial information, and mode of deformation(s).

Fabrication of Exemplary Embodiment

In an exemplary (i.e., non-limiting embodiments, a waveguide comprises an elastomer cladding (e.g., silicone elastomer cladding), enclosing two or more transparent elastomer cores (e.g., transparent polyurethane (PU) elastomer cores). The cores (e.g., a first core and second core) can have various configurations. For example, the two cores are placed with one on top of the other, separated by a shared thin layer of transparent or translucent cladding layer (e.g., silicone layer).

The cores can be fabricated by, for example, replica molding transparent elastomers (e.g., PU elastomers such as, for example, Clear Flex 30, SMOOTH-ON) using a silicone mold (prepared by casting a stiff silicone elastomer (e.g., ELASTOSIL M4601, Wacker Chemie AG) over a 3D printed rigid mold).

For example, a first core (e.g., a first core such as, for example, a PU core) is fabricated by replica molding transparent PU elastomers (Clear Flex 30, SMOOTH-ON) using a silicone mold (prepared by casting a stiff silicone elastomer (ELASTOSIL M4601, Wacker Chemie AG) over a 3D printed rigid mold). Cavities are then patterned in the cured first core, which are later filled and cured with transparent elastomer (e.g., Clear Flex 30) doped with one or more visible color absorbing dyes (e.g., water clear visible color absorbing dyes such as, for example, EP7701, available from Eager Polymers). A second core (e.g., PU core) is fabricated with a transparent elastomer (e.g., Clear Flex 30), using the same method as described above with respect to the first core, but without cavities or color absorbing dyes.

For example, the elastomer cladding (e.g., silicone cladding such as, for example, Dragon Skin 20, SMOOTH-ON) of the waveguide having a cavity is replica molded using 3D printed plastic mold. A first core (e.g., a "bottom" or "lower" core such as, for example, a bottom PU core) is transferred to the cavity of the elastomer cladding, with patterned color areas facing up. A thin layer of translucent elastomer such as, for example, translucent silicone (e.g., Dragon Skin 20, SMOOTH-ON) or transparent silicone (e.g., SYLGARD 184, DOW CORNING) is deposited over the colored face of PU. A second core (e.g., a "top" or "upper" PU core) is transferred over the thin silicone layer. Then, a top layer of elastomer cladding (e.g., silicone cladding such as, for example, Dragon Skin 20, SMOOTH-ON) is deposited over the second core to complete the waveguide cladding. The device is left to finish curing (e.g., at room temperature for 4 hours).

While replica molding is described in the foregoing example, fabrication of the sensor (e.g., core formation and cladding formation) can also be carried out using 3D printing, including both Direct Ink Writing and Stereolithography.

At an input end of the waveguide, a broad-spectrum light source, such as a white LED chip (Cree Inc. XQEAWT-H2-0000-00000BEE5), is coupled and aligned with the first core. At an output end of the waveguide, a detector, such as an RGB sensor chip (TCS3472, TAOS), is attached and aligned with the first core and another is attached and aligned with the second core (see FIG. 2). Various sources and detectors can be used. Non-limiting examples of sources include visible light sources, infrared sources, and the like or combinations thereof. Non-limiting examples of detectors include visible light sensors (including RGB sensors), infrared sensors, and the like or combinations thereof.

Further Description

The interstitial cladding may be considered as a partial light-blocking layer. For example, interstitial cladding is between two cores, for example, a first and second core, such that when one core (e.g., a second core) is pressed, the interstitial cladding becomes thin and deformed enough for the light to enter the one core from the other core (e.g., the second core from the first core). The thickness of the interstitial cladding (e.g., denoted as $t_{ic}$) may depend on the thicknesses of the two cores (e.g., the first and second core), as well as the requirement for sensitivity and range of the pressing force. With a thinner $t_{ic}$, the pressing force sensitivity will increase (be more sensitive). With a thicker $t_{ic}$, the sensor will be able to sense larger pressing forces. $t_{ic}$ is a tunable parameter for different applications, and can span a wide range of thicknesses. For example, using typical core dimensions (e.g., core dimensions described herein), an approximate range of $t_{ic}$ can be greater than 0 mm and smaller than 2 mm.

The present disclosure utilizes the application of a dye or dyes (e.g., absorbing dye(s)) to achieve the goal of low cost, and compact arrangement of differentiation and distributive sensing of various deformations. Various arrangements of cladding, core(s) and dye(s) are described herein. Alternative embodiments of the waveguide(s) include one or more the following:

Different placement of the dyes. For example, dyes can be doped in silicone cladding instead of in PU cores, or dyes can be placed in multiple planes to detect deformations in different directions.

Different shapes of the core and cladding layers instead of straight rectangles

Different number of cores

Different placement of core and cladding layers

Different length of the sensor

Different off-the-shelf materials for fabricating the core and the cladding

Different placement of rigid optoelectronic components: LED and RGB sensors. With one end of the waveguide coated with reflective coating, LED and RGB sensors can be arranged to be on the same end of the waveguide, making the overall sensor design more compact.

The sensor (which can be referred to as a waveguide sensor) can be used by itself, i.e., one waveguide alone, to sense deformations such as pressing, bending, stretching, or a combination thereof and reconstruct shapes in 2D space. In another configuration, by arranging multiple waveguides side-by-side and/or in different layers, a 2D distributive sensing plane can be constructed for real time sensing and shape reconstruction in 3D space.

A waveguide sensor or a plurality of waveguide sensors can be integrated into a soft machine or robot based on the arrangements (e.g., as described herein) for sensing and shape reconstruction in wide applications including, for example, remote surgery, VR gloves, soft orthotics/prosthetics, robotic hand/arm, and the like.

In an example, a soft machine or robot comprises one or more waveguide sensors of the present disclosure. In the case where the soft machine or robot comprises a plurality of waveguide sensors, the sensors can all be the same sensor configuration or a combination of at least two different sensor configuration.

The steps of the method described in the various embodiments and examples disclosed herein are sufficient to carry out the methods of the present invention. Thus, in an embodiment, the method consists essentially of a combination of the steps of the methods disclosed herein. In another embodiment, the method consists of such steps. In another embodiment, the method comprises such steps.

In the following, various Examples of the present disclosure are described:

Example 1. A waveguide, comprising a first core having a first refractive index; a second core having a second refractive index, the second core being spaced apart from and parallel with the first core; a cladding surrounding the first core and the second core, the cladding having a refractive index lower than the first refractive index and the second refractive index, and wherein an interstitial portion of the cladding is located between the first core and the second core; and wherein a first region of the first core adjacent to the cladding or of the cladding adjacent to the first core is color dyed.

Example 2. The waveguide of Example 1, wherein the first color-dyed region is of the first core and adjacent to the interstitial cladding.

Example 3. The waveguide of any one of the preceding Examples, wherein the first color-dyed region extends over a cross-sectional area of the first core which is less than or equal to 50% of a cross-sectional area of the first core.

Example 4. The waveguide of any one of the preceding Examples, wherein the cladding comprises silicone.

Example 5. The waveguide of any one of the preceding Examples, wherein the first core and/or the second core comprises polyurethane.

Example 6. The waveguide of any one of the preceding Examples, wherein a cross-sectional area of the first core is larger than a cross-sectional area of the second core.

Example 7. The waveguide of any one of the preceding Examples, wherein the first refractive index is the same as the second refractive index.

Example 8. The waveguide of any one of the preceding Examples, wherein the first core has a diameter of 10 μm to 5 cm, inclusive, including all integer μm values and ranges therebetween, and/or a cross sectional area of 100 μm2 to 25 cm2, inclusive, including all integer μm2 values and ranges therebetween.

Example 9. The waveguide of any one of the preceding Examples, wherein the second core has a diameter of 10 μm to 5 cm, inclusive, including all integer μm values and ranges therebetween, and/or a cross sectional area of 100 μm2 to 25 cm2, inclusive, including all integer μm2 values and ranges therebetween.

Example 10. The waveguide of any one of the preceding Examples, wherein the first core has a cross-sectional shape that is circular, polygonal, or the like.

Example 11. The waveguide of any one of the preceding Examples, wherein the second core has a cross-sectional shape that is circular, polygonal, or the like.

Example 12. The waveguide of any one of the preceding Examples, wherein the first core and the second core are made from a material with a higher hardness than the material of the cladding.

Example 13. The waveguide of any one of the preceding Examples, wherein the first core has one or more additional color-dyed regions.

Example 14. The waveguide of Example 13, wherein the first color-dyed region and/or the one or more additional color-dyed regions do not overlap one another along a longitudinal length of the first core.

Example 15. The waveguide of Example 13, wherein the first color-dyed region overlaps with an additional color-dyed region along the length of the first core.

Example 16. The waveguide of Example 15, wherein the overlapping first color-dyed region and additional color-dyed region are tapered so as to form a color gradient along the length of the first core.

Example 17. The waveguide of any one of the preceding Examples, further comprising a third core adjacent to the first core and a second interstitial cladding is located between the third core and the first core; and wherein a second region of the first core adjacent to the second interstitial cladding is color dyed.

Example 18. A sensor, comprising a waveguide according to any of the preceding Examples; a broad-spectrum light source coupled to an input end of the first core; a first detector coupled to an output end of the first core; and a second detector coupled to an output end of the second core.

Example 19. The sensor of Example 18, further comprising a controller in electronic communication with the first detector and the second detector, the controller configured to determine a position and/or magnitude of an external force based on light received at the first detector and/or the second detector.

Example 20. The sensor of any of Examples 18-19, wherein the input end of the first core is at an opposite end of the first core from the input end.

Example 21. A method of detecting a deformation of a waveguide, comprising providing a sensor of any one of Examples 18-20; detecting a light change at the output end of the first core and the second core; and differentiating and/or measuring the deformation of the waveguide based on the detected light change.

Example 22. The method of Example 21, wherein the light change comprising light intensity change and RGB change.

Although the present disclosure has been described with respect to one or more particular embodiments, it will be understood that other embodiments of the present disclosure may be made without departing from the spirit and scope of the present disclosure.

What is claimed is:

1. A waveguide, comprising:
    a first core having a first refractive index;
    a second core having a second refractive index, the second core being spaced apart from and parallel with the first core;
    a cladding surrounding the first core and the second core, the cladding having a refractive index lower than the first refractive index and the second refractive index, and wherein an interstitial portion of the cladding is located between the first core and the second core;
    wherein a first region of the first core adjacent to the cladding or of the cladding adjacent to the first core is color dyed, wherein the first core has one or more additional color-dyed regions, and wherein the first color-dyed region and/or the one or more additional color-dyed regions do not overlap one another along a longitudinal length of the first core.

2. The waveguide of claim 1, wherein the first color-dyed region is of the first core and adjacent to the interstitial cladding.

3. The waveguide of claim 1, wherein the first color-dyed region extends over a cross-sectional area of the first core which is less than or equal to 50% of a cross-sectional area of the first core.

4. The waveguide of claim 1, wherein the cladding comprises silicone.

5. The waveguide of claim 1, wherein the first core and/or the second core comprises polyurethane.

6. The waveguide of claim 1, wherein a cross-sectional area of the first core is larger than a cross-sectional area of the second core.

7. The waveguide of claim 1, wherein the first refractive index is the same as the second refractive index.

8. The waveguide of claim 1, wherein the first core has a diameter of 10 μm to 5 cm, and/or a cross sectional area of 100 μm2 to 25 cm2.

9. The waveguide of claim 1, wherein the second core has a diameter of 10 μm to 5 cm, and/or a cross sectional area of 100 μm2 to 25 cm2.

10. The waveguide of claim 1, wherein the first core has a cross-sectional shape that is circular, or polygonal, or wherein the second core has a cross-sectional shape that is circular or polygonal.

11. The waveguide of claim 1, wherein the first core and the second core are made from a material with a higher hardness than the material of the cladding.

12. The waveguide of claim 1, further comprising a third core adjacent to the first core and a second interstitial cladding is located between the third core and the first core; and wherein a second region of the first core adjacent to the second interstitial cladding is color dyed.

13. A sensor, comprising:
    a waveguide according to claim 1;
    a broad-spectrum light source coupled to an input end of the first core;
    a first detector coupled to an output end of the first core; and
    a second detector coupled to an output end of the second core.

14. The sensor of claim 13, further comprising a controller in electronic communication with the first detector and the second detector, the controller configured to determine a position and/or magnitude of an external force based on light received at the first detector and/or the second detector.

15. The sensor of 13, wherein the input end of the first core is at an opposite end of the first core from the input end.

16. A method of detecting a deformation of a waveguide, comprising:
    providing a sensor of claim 13;
    detecting a light change at the output end of the first core and the second core; and
    differentiating and/or measuring the deformation of the waveguide based on the detected light change.

17. The method of claim 16, wherein the light change comprising light intensity change and RGB change.

18. A waveguide, comprising:
    a first core having a first refractive index;
    a second core having a second refractive index, the second core being spaced apart from and parallel with the first core;
    a cladding surrounding the first core and the second core, the cladding having a refractive index lower than the first refractive index and the second refractive index, and wherein an interstitial portion of the cladding is located between the first core and the second core;
    wherein a first region of the first core adjacent to the cladding or of the cladding adjacent to the first core is color dyed, wherein the first core has one or more additional color-dyed regions, and wherein the first color-dyed region overlaps with an additional color-dyed region along the length of the first core.

19. The waveguide of claim 18, wherein the overlapping first color-dyed region and additional color-dyed region are tapered so as to form a color gradient along the length of the first core.

* * * * *